United States Patent [19]

Marcellin

[11] Patent Number: 4,674,560
[45] Date of Patent: Jun. 23, 1987

[54] PROCESS AND APPARATUS FOR CONTROL OF THE HEAT TRANSFER PRODUCED IN A FLUIDIZED BED

[75] Inventor: Michel Marcellin, Le Creusot, France

[73] Assignee: Framatome & Cie, Courbevoie, France

[21] Appl. No.: 709,269

[22] Filed: Mar. 7, 1985

[30] Foreign Application Priority Data

Mar. 8, 1984 [FR] France ................................ 84-03580

[51] Int. Cl.[1] ............................................. F28C 3/16
[52] U.S. Cl. ........................................ 165/1; 165/32; 165/96; 165/104.16
[58] Field of Search ...................... 165/104.16, 104.18, 165/1, 39, 96, 32; 422/145, 146, 147; 34/57 A

[56] References Cited

U.S. PATENT DOCUMENTS 2,698,171 12/1954 Schoenmakers et al. ........... 422/146
4,356,151 10/1982 Woebcke et al. .............. 165/104.18
4,531,570 7/1985 Dries ............................. 165/104.18
4,552,203 11/1985 Chrysostome et al. ........ 165/104.18

FOREIGN PATENT DOCUMENTS 24710 2/1983 Japan ................................. 34/57 A Primary Examiner—Albert W. Davis, Jr.
Attorney, Agent, or Firm—Pollock, Vande Sande & Priddy

[57] ABSTRACT

Process and apparatus for control of the heat transfer between a circulating bed of solid particles and a heat exchanger (6) located inside a fluidization enclosure (1) supplied with solid particles and connected to a device for recovering (4) and recycling (5) the particles into the fluidized bed. The heat exchange coefficient of the exchanger (6) is adapted at each moment to the heat transfer requirements of the plant by varying in the same sense the concentration of solid particles in the circulating bed, by increasing or reducing the quantity of circulating particles to increase or reduce, respectively, the exchange coefficient to the value required by the demand. The invention is particularly applicable to steam production boilers operating on coal.

2 Claims, 2 Drawing Figures

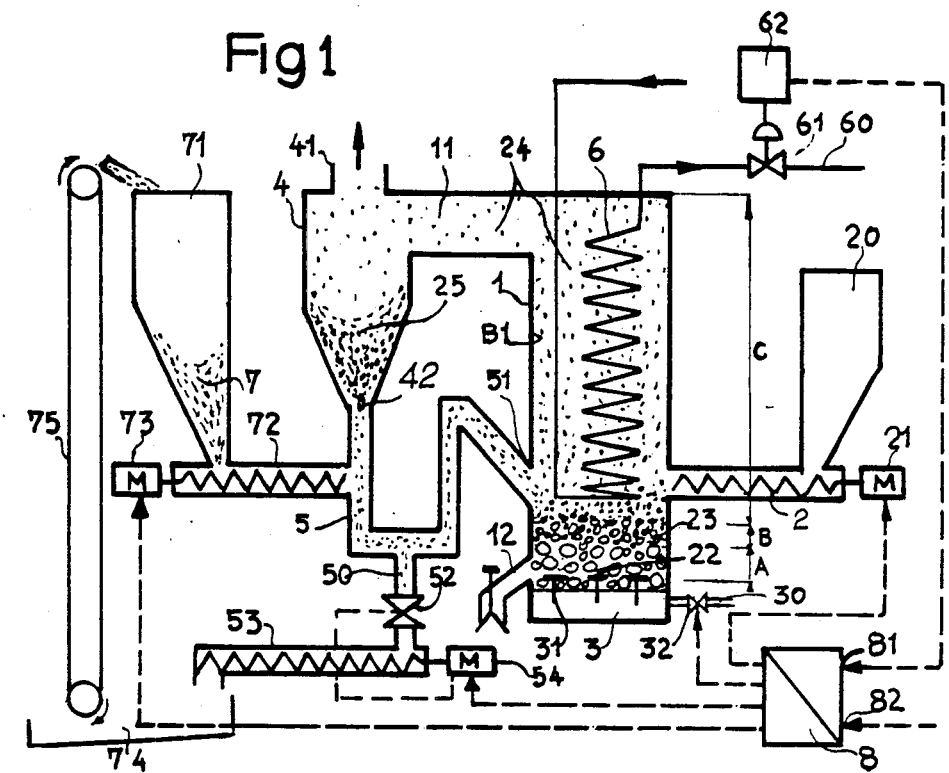
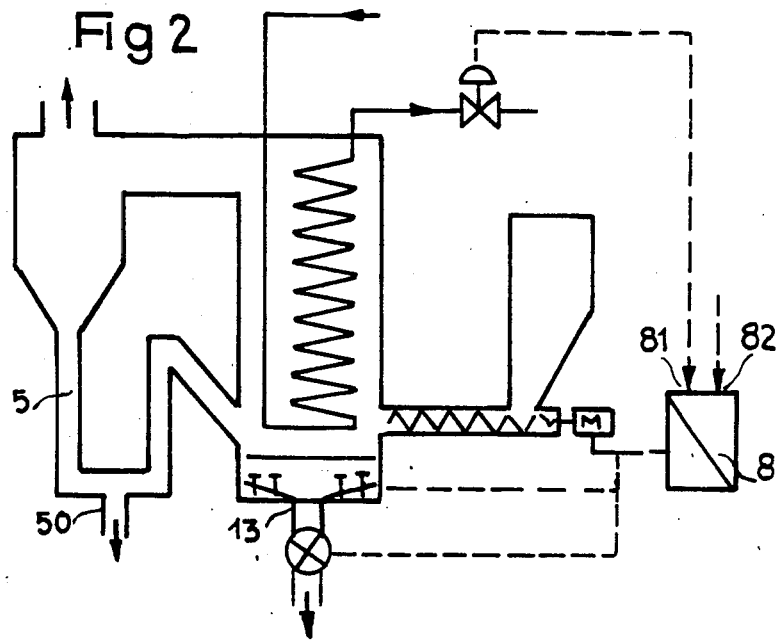

PROCESS AND APPARATUS FOR CONTROL OF THE HEAT TRANSFER PRODUCED IN A FLUIDIZED BED

FIELD OF THE INVENTION

The subject of the invention is a process and an apparatus for control of the heat transfer produced between a circulating fluidized bed of solid particles arranged in an enclosure and a heat-transfer fluid circulating in a heat exchanger placed inside the enclosure. The invention applies especially to the control of a boiler for steam production.

PRIOR ART

It is known that a fluidized bed of solid particles has the advantage of producing outstanding heat transfer between fluidized particles and a heat-transfer fluid circulating in an exchanger placed in the fluidized bed. The latter is produced inside an enclosure supplied with solid particles and fitted at its base with means for fluidizing the particles by circulation of an upward stream of gas at a controllable velocity. The gas escapes from the upper part of the enclosure by a discharge circuit which runs into a device for recovering the particles of sufficiently fine particle size to be entrained with the gases, taking into account the velocity of the latter. In particular, if the fluidization velocity exceeds a limiting velocity of the order of 2 m/second, the fluidized bed operates in a regime referred to as circulating. In fact, a considerable proportion of solid particles is entrained with the gases and within the enclosure it is possible to distinguish a dense phase, with a high concentration of fluidized particles, and a dilute phase containing a smaller, but nevertheless appreciable quantity of solid particles. The latter are recovered in a separator which is connected to the base of the fluidized bed by a recycle circuit. There is, therefore, continuous circulation of fine particles between the fluidized bed enclosure and the recovery device.

Fluidized beds are employed in particular for the combustion of solid fuel substances, the circulating bed operation making it possible, in particular, to ensure complete combustion, since the fine particles which are incompletely burned and entrained with the fumes are recycled into the fluidized bed. This is the case, in particular, with boilers for steam production incorporating a fluidized bed heating chamber supplied with a fuel substance in the form of solid particles and a combustive gas usually constituting the fluidizing gas, and in which is placed a heat exchanger through which water is passed to produce steam. In conventional boilers, when steam demand changes, the fuel and combustive gas feed is modified accordingly so as to adapt the heat production to the steam demand. When the fuel is a liquid or gaseous hydrocarbon, the adaptation can take place quickly and flexibly, but this is not the case when a solid fuel such as coal is employed, the boiler then having a much greater inertia. Moreover, while it is possible to control at will the supply of a liquid or gaseous fuel, and consequently the temperature produced, the latter cannot be readily controlled when the fuel is solid. In fact, if the temperature is too high, the fusion temperature of the ash is exceeded, which presents known disadvantages, and if the temperature is too low, for example below 600° C., there is the risk that the coal may be extinguished.

SUMMARY OF THE INVENTION

An object of the invention is to remedy these disadvantages by giving the plant a flexibility of operation which did not exist hitherto and by making it possible, even with a solid fuel, to control the heat transfer so as to adapt to the demand and in particular, in a boiler, to produce steam at a desired pressure and rate.

In accordance with the invention, the heat exchange coefficient of the exchanger is adapted at each instant to the heat transfer demand of the plant by modifying, in the same direction, the concentration of solid particles in the circulating bed by increasing or reducing the quantity of circulating particles in order to increase or reduce correspondingly the exchange coefficient to a value required by the demand.

To increase the concentration of particles in the circulating bed, in a preferred embodiment, a controlled flow of inert particles with sufficiently fine particle size for them to be entrained with the gases is introduced into the recycle circuit. Conversely, the concentration in the circulating bed is decreased by withdrawing a controlled flow of particles from the recycle circuit.

When the substance to be treated is submitted in the fluidized bed to a reaction producing fine residues, as is the case, for example, with the combustion of a solid fuel, the withdrawal flow of the residues is varied in the opposite direction to the desired change in the heat exchange coefficient in order to maintain in the fluidized bed the concentration of fine particles which determines an exchange coefficient corresponding to the heat transfer requirements.

The invention is particularly suitable for the control of steam production in a fluidized bed boiler. In this case, in fact, the boiler may be associated with a regulating device which makes it possible to control the supply of fuel and combustive fluid as a function of steam pressure to bring the latter to the desired value. According to the invention, the fluidized bed boiler is associated with a device for feeding inert particles at a variable flow rate and a device for withdrawing recycled particles at a variable flow rate and the regulating device calls for an increase in the feed rate of inert particles or an increase in the withdrawal rate, to determine, respectively, an increase or a reduction in steam pressure.

BRIEF DESCRIPTION OF THE DRAWINGS

The invention will be more clearly understood better, however, from the following description of several embodiments given by way of example and shown in the attached drawings.

FIG. 1 is a general diagram of a steam production plant according to the invention.

FIG. 2 is a diagram of a simplified plant.

DETAILED DESCRIPTION

FIG. 1 shows diagrammatically the whole of a steam production plant incorporating a boiler 1 consisting of a vertical cylindrical enclosure supplied with a fuel substance, such as coal stored in a hopper 20, through the intermediacy of a feed device 2 consisting, for example, of a screw driven by a motor 21.

Enclosure 1 is fitted at its base with means for fluidizing the solid particles introduced by the device 2 and consists, for example, of a plenum chamber 3 placed at the bottom of the enclosure, opening into the interior of the latter through the intermediacy of a plurality of diffusers 31 and connected to a gas feed line 30 fitted with a flow regulator 32.

In its upper part, enclosure 1 is connected by a gas discharge line 11 to a separating device 4 consisting, for example, of a mechanical separator of the cyclone type incorporating an upper outlet 41 for gases and a lower outlet 42 for recovered solid particles, connected to the base of enclosure 1 by a recycle circuit 5 consisting, for example, of a siphon-shaped line opening at 51 into enclosure 1.

The fuel introduced by the feed device 2 contains particles of various sizes even when the particle size distribution is relatively homogeneous. Depending on the circulation velocity of the gases in enclosure 1, several superposed zones can be distinguished inside the latter. Firstly, immediately above the diffusers 31, there may be a zone A consisting of a fixed bed of material which is too bulky to be lifted by the gases, such as, for example, agglomerated ash. This can be removed at regular intervals by a purge 12.

Above the fixed bed A (if there is one) there is a dense phase zone B containing, on the one hand, particles capable of being suspended by the gas stream but too heavy to be entrained by the latter and, on the other hand, fine particles which are entrained by the gases and which pass through zone B before being entrained into the upper part of the enclosure. The particle concentration in zone B is thus considerable, since the voidage, i.e., the proportion of void per unit volume, can be 0.5.

The entire upper part of enclosure 1 forms a dilute-phase zone C, i.e., a zone containing some proportion of solid particles which are sufficiently fine to be entrained with the gases, where the voidage can be, for example, 0.95. The latter depends on the circulation velocity of the gases, given that, below a limiting velocity, only a small quantity of extremely fine particles is entrained with the gases. This limiting velocity is known to be of the order of 2 m/s, and it is from this velocity on that the fluidized bed operates in a regime referred to as circulating. In fact, the particles entrained with the gases are recovered in separator 4 and accumulate at the bottom of the latter and are then recycled into the fluidized bed via the recycle line 5, the latter being siphon-shaped. As a result, the fine particles can circulate through the fluidized bed several times until combustion of the carbon which they contain is completed. At regular intervals, the ash which thus accumulates can be discharged either via the purge 12, or via a withdrawal line 50 placed in the recycle circuit 5 and provided with a valve 52.

Inside enclosure 1 is placed a tube bundle 6 for circulating a heat-transfer fluid, which forms a heat exchanger. When the plant is a boiler, the heat-transfer fluid is water, which is vaporized inside enclosure 1 and supplies steam to a user circuit 60.

In some cases, to increase the quantity of heat absorbed by the water, the latter is passed through tubes which directly cross the dense zone B of the fluidized bed. However, since the fuel particles are abrasive, these tubes wear rapidly. For this reason, in general, exchanger 6 is placed within the dilute phase C of the fluidized bed.

Until now, it was not known how to vary the heat exchange coefficient and, consequently, to adapt heat transfer to demand, it was possible to modify only the supply of fuel and combustive fluid. For example, when steam demand increases, the temperature of the fluidized bed can be raised by increasing the flow of fuel feed via device 2 and of combustive gas via feed line 30. However, the temperature in the dilute zone C does not rise proportionally and, furthermore, it is undesirable to exceed the fusion temperature of the ash.

As has been seen, when steam demand decreases, it is even more difficult to reduce heat transfer by modifying the temperature of the fluidized bed because if this is lowered too much, there is a risk of extinguishing.

According to the invention, on the contrary, outstanding flexibility of operation is obtained by introducing into the fluidized bed a controlled flow of inert particles 7 stored in a hopper 71 and introduced into the fluidized bed by a feed device 72 consisting, for example, of a screw driven by a motor 73. To reduce the risks of disturbing the fluidized bed by the introduction of cold particles, the feed device 72 preferably discharges into the recycle circuit 5 so that the inert particles 7 are heated in contact with the recovered particles 25 before being reintroduced into the fluidized bed at 51.

By thus introducing into the fluidized bed a controlled flow of inert particles which are sufficiently fine to be entrained with the gases, the concentration of the dilute phase C, and consequently the quantity of heat which can be absorbed by the water circulating in exchanger 6, is increased. In fact, the overall exchange coefficient is proportional to the voidage of the dilute phase. At the same time, the flow of fuel introduced by device 2 is increased, and so is that of the fluidizing air introduced via line 30 in order to retain an excess of air which is appropriate for good combustion. This results in an increase in fluidization velocity, which also tends to increase the exchange coefficient. The inert particles 7 introduced into the circuit are thus heated and transfer the absorbed heat to exchanger 6.

As the particle concentration is increased, an increase is also produced in the height of the dense zone B which can reach a level $B_1$, for example. Thus, the lower part of the exchanger can be placed within the dense zone of the fluidized bed in which heat transfer is greater because the concentration of hot particles is higher. To reduce the risks due to abrasion, the fixed exchanger can be in the shape of a cylindrical sleeve parallel to the wall of enclosure 1 so as not to resist the upward circulation of the gases, or consist of a membranous wall. Furthermore, the operation of the plant may be controlled so that, for normal steam production, exchanger 6 is located only in the dilute zone C, the lower part being in the dense zone B, and to a variable depth, only in the cases where steam demand increases.

When steam production is to return to normal, the supply of inert particles 7 is stopped and the concentration of particles is returned to the normal value by withdrawing the excess quantity of particles via the withdrawal line 50 which opens into a discharge device 53 consisting, for example, of a screw driven in rotation by a motor 54 inside a sleeve in which cooling of the particles takes place. The latter are discharged into a hopper 74, from which they are taken again, for example by a bucket elevator 75 to be reintroduced into the storage hopper 71.

When steam demand decreases, it is also possible to reduce the concentration of solid particles and, as a result, the heat exchange coefficient, by withdrawing an additional flow of particles via line 50.

Means are thus available for increasing or decreasing the heat exchange coefficient with fairly high accuracy and, consequently, for adapting heat transfer continuously to plant requirements at each moment.

It is furthermore possible to carry out automatic regulation of the process which has just been described. To this end, the steam pressure measured at 61 in the user circuit 60 may be converted by a device 62 into a proportional signal which is displayed at the input 81 of a regulating device 8 receiving at its other input 82 a signal proportional to the required pressure. The regulating device 8 compares the measured pressure with the required pressure, calculates the various parameters of the plant and transmits corresponding control signals to the motor 21 and the valve 32 to regulate the supply of fuel and of combustive fluid, and also to the motor 73 of the device 72 for feeding inert particles or to the motor 54 of the withdrawal device 53. In this way, it is possible to modify the heat exchange coefficient at the same time as the supply of fuel and combustive fluid to bring steam pressure to the required value and to maintain it at this value.

The invention is not restricted to the details of the embodiment just described, it being possible for other equivalent means to be employed to fulfill the same functions. Moreover, in some cases the plant could be simplified as shown in FIG. 2. In fact, in the case of high-ash coal having, for example, an ash content greater than 30%, it could be sufficient to modify the rate of ash discharge with a withdrawal device 13 placed at the base of the hearth so as to modulate the operation of the boiler. Ash could moreover be discharged in parallel by device 13 for withdrawal from the fluidized bed and by a withdrawal device 50 placed in the recycle circuit 5 for recovered ash.

Normally, the rate of withdrawal of ash is regulated so as to keep the dense phase at a substantially constant level. As the rate of withdrawal is reduced, accumulation of ash replaces the introduction of inert substances described earlier and consequently makes it possible to increase the heat exchange coefficient. Conversely, as soon as the quantity of heat to be supplied is reduced, the quantity of ash required to restore the original situation, or even to reduce the concentration of solid particles further, is withdrawn by means of the purge device 13 and, if appropriate, the withdrawal device 50.

In all cases, it may be useful to know the height of the dense phase. For this purpose, differential pressure sensors may be distributed along the fluidized column in the vertical enclosure 1, their signals being transmitted to the regulating device 8.

For greater accuracy, the invention has been described with respect to of a boiler, but it could be employed advantageously in any case where heat transfer is produced in a fluidized bed of particles, in the case of reactions which must be carried out at a substantially constant temperature such as, for example, ore roasting reactions (roasting of pyrites or calcining of alumina) or for air gasification of biomass or the treatment of black liquors in papermaking.

What is claimed is:

1. Process for the control of heat transfer between a circulating bed of solid particles and a heat exchanger (6) placed inside an enclosure (1) supplied with solid particles, provided at its base with means (3) for fluidizing the particles by circulation of an upward stream of gas at a controllable velocity and connected to a device (4) for recovering particles of sufficiently fine particle size to be entrained with the gases, taking into account the velocity of the latter, at least a part of the recovered particles being reintroduced into the fluidized bed via a recycle circuit (5), the heat exchange coefficient of the exchanger (6) being placed at each moment to the heat transfer demand of the plant by varying in the same direction the concentration of solid particles in the circulating bed, said process including the steps of
   (a) increasing the concentration of particles in the circulating bed by introducing into the recycle circuit (5) a controlled flow of inert particles of a particle size sufficiently fine so that they may be entrained with the gases; and
   (b) reducing the concentration of the circulating bed by withdrawing a controlled flow of particles from the recycle circuit.

2. Control process as claimed in claim 1, including the steps of
   (a) subjecting the substance to be treated in the fluidized bed to a reaction producing fine residues which are entrained with the gases and are withdrawn from the recycle circuit by a variable-rate withdrawal device (50); and
   (b) changing the withdrawal rate of the residues in the direction opposite to the desired change in the heat transfer coefficient to maintain the required concentration of fine particles in the fluidized bed.

* * * * *